INVENTOR
WILLIAM E. FOSTER

April 4, 1967 W. E. FOSTER 3,312,361
CONVERTER UNIT
Filed May 6, 1965 2 Sheets-Sheet 2
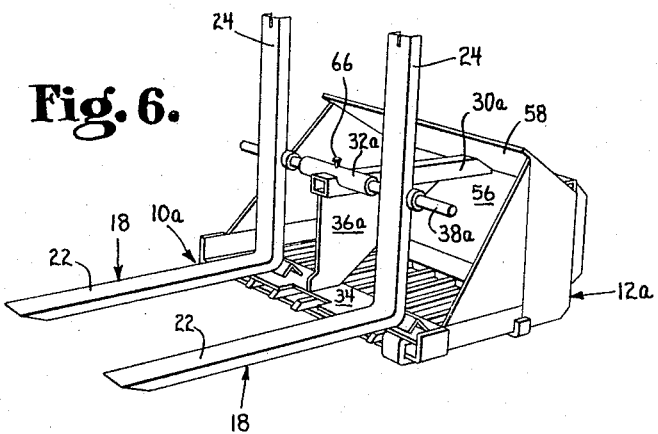
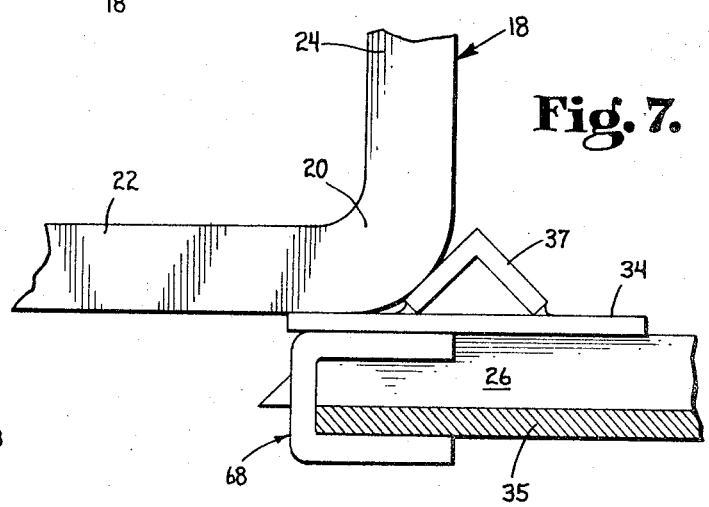
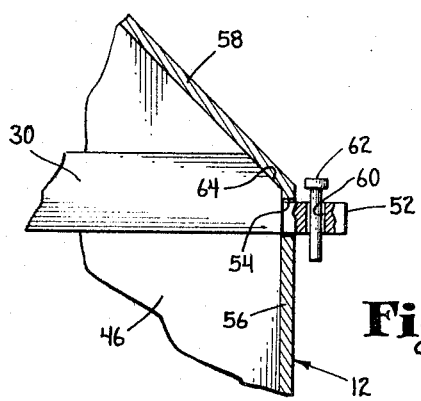
INVENTOR
WILLIAM E. FOSTER
BY Lockwood, Woodard, Smith & Weikart
Attorneys United States Patent Office 3,312,361
Patented Apr. 4, 1967

3,312,361
CONVERTER UNIT
William E. Foster, R.R. 6, Box 1038,
Kokomo, Ind. 46901
Filed May 6, 1965, Ser. No. 453,803
11 Claims. (Cl. 214—145)

The present application is a continuation-in-part of the copending application of the same inventor, Ser. No. 397,779, filed Sept. 21, 1964, now Patent No. 3,249,245.

This invention relates to a converter means for utility vehicles having power scoops or buckets for earth-scooping and other scooping and moving tasks; more particularly, the present invention provides a converter means which adapts such vehicles for use as a fork-lift truck, thus providing versatility and the economical and convenient utilization of the vehicle for uses requiring the operating characteristics of a fork-lift truck.

Vehicles having scoops or buckets, such as a "utility bucket loader" with which the present invention is described, have great power and have great usage in moving objects according to particular agricultural and industrial needs.

However, a user of such a vehicle often has occasion to need the operating features of a fork-lift truck. For example, a farmer may be using his bucket loader to move compost with the vehicle scoop, when a delivery of palletized fertilizer arrives which must be unloaded from the delivery truck and moved into a barn for storage, and then the scoop-usage of the vehicle would be resumed. There are many other needs and usages of a vehicle which is easily adaptable between a scoop and fork-lift, particularly but not limited to agricultural situations involving a routine usage as a scoop but an occasional usage as a fork-lift to handle palletized delivery and palletized storage.

However, insofar as the desired versatility is concerned, the scoop or bucket of a utility bucket loader is quite heavy and bulky; and, although the bucket of many of these vehicles may be removed, the heaviness and awkwardness of the bucket makes removal and re-installation of the bucket quite a burdensome task. The task is such that many owners or users, who would have special desire for versatility of the vehicle, would not likely have the equipment to use in removing the bucket and re-installing it after the vehicle has been used for the auxiliary duty. Even with power available for bucket removal and re-installation, the task would be unhandy and bothersome, even if the extra labor-time were the only consideration.

Concepts of the present invention, accordingly, provide a converter means which adapts a scoop vehicle for use as a fork-lift truck without the removal of the scoop or bucket of the vehicle, thus obtaining versatility conveniently and economically, for utilizing the vehicle and its power for the fork-lift usage. Moreover, the concepts provide an economical load-leveler means, and provide a co-operating utilization of the shape and formation details of the bucket to high advantage; and the concepts permit the converter means to be rapidly and conveniently assembled onto and removed from the vehicle, assembly and removal taking only a few moments and requiring no tools other than pliers or a screwdriver to assist in a simple pin-pulling detail.

These and other concepts and details of the present invention, advantageously providing a converter means for convenient, rapid, and economical adaptation of a scoop-type vehicle for auxiliary use as a fork-lift truck, will further appear in the following more detailed description, together with the accompanying somewhat diagrammatic drawings, in which:

FIG. 5 is a detail view illustrating the connection of the converter means to the bucket at an upper rear location of the bucket;

FIG. 6 is a pictorial view similar to FIG. 2, but illustrating a modified converter means on a larger bucket; and FIG. 7 is an enlarged detail view of a portion of the converter means of FIG. 6, illustrating the base support of a fork-lift on the bucket.

Figure 1:
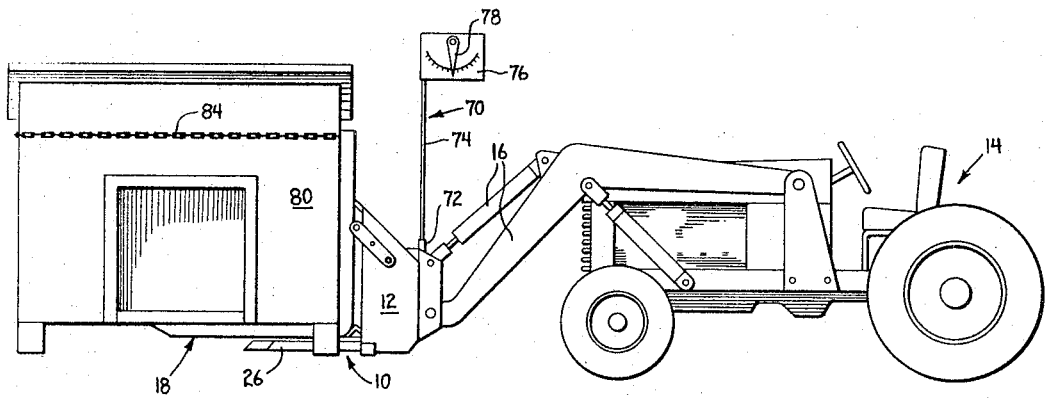
FIG. 1 is an elevation view of a tractor-type vehicle known as a bucket loader, having a converter means according to concepts of the present invention installed on the bucket thereof, and having a level indicator installed on the bucket.

As shown in FIG. 1, a converter means 10 is shown assembled onto a scoop or bucket 12 of an associated utility vehicle 14 which is of a front-end loader type known as a bucket loader. The bucket 12 of such a vehicle provides for the scooping and moving of many sorts of material as the user may desire; and it is movably supported by links or arms 16 powered by the vehicle.

In accordance with concepts of the present invention, the converter means 10 quickly and economically adapts the vehicle 14 for auxiliary duty, particularly for palletized material, by providing fork-lifts 18, this versatility being provided without the need to remove or re-install the bucket 12, thus avoiding a burdensome and bothersome task as mentioned above.

Accordingly, the converter means 10 shown provides a pair of laterally-spaced lift prongs or forks 18, shown as formed of metal U-shaped in cross-section and centrally bent as at 20 into a general L-shape providing a forwardly extending horizontal leg 22 and a vertical leg 24. The forks 18 provide a means for lifting palletized or other bulk material, the wide use of lift-forks being well known. (Although many buckets are provided with forwardly-extending digging prongs 26, as are shown on the bucket 12 illustrated, such prongs 26 are not well-suited for most of the lift-situations to which fork-lifts are adapted.)

Figure 3:
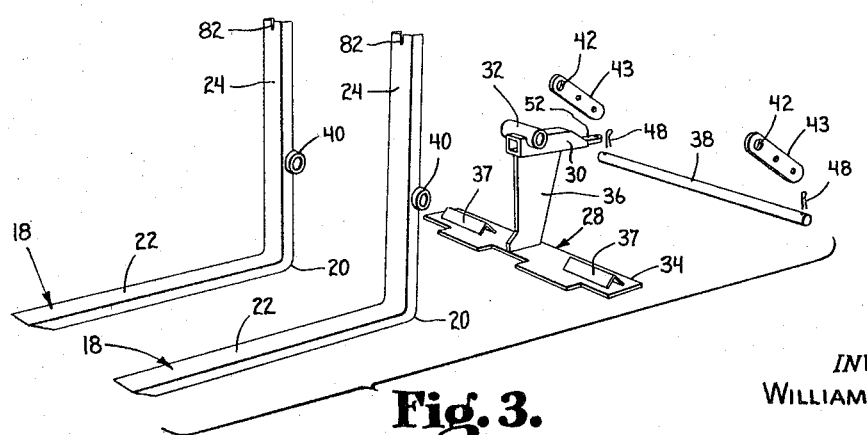
FIG. 3 is an exploded view of the converter means.

Support for the lift-forks 18 will now be described. As best shown in FIG. 3, this support of the forks 18 includes a supporting bracket generally designated by numeral 28; and the bracket 28 includes an upper fore-and-aft support member 30, an upper laterally-extending support sleeve 32, a lower lateral-extending adapter or base-plate 34 which lies along the upper face of the bucket bottom-plate 35 or along the upper face of digging prongs 26 according to the nature of the bottom plate assembly of the particular bucket, and a supporting plate or column 36 disposed in a fore-and-aft plane and extending vertically between support members 30 and 34.

The base-plate 34 is provided on its upper face, and adjacent each end thereof, with a laterally-extending mount or seat 37, shown of inverted V-shape, against which the bend 20 of lifts 18 bear, supporting each of the lifts 18. All of members 30, 32, 34, 36, and 37 are rigidly interconnected, as by welding.

Figure 2:
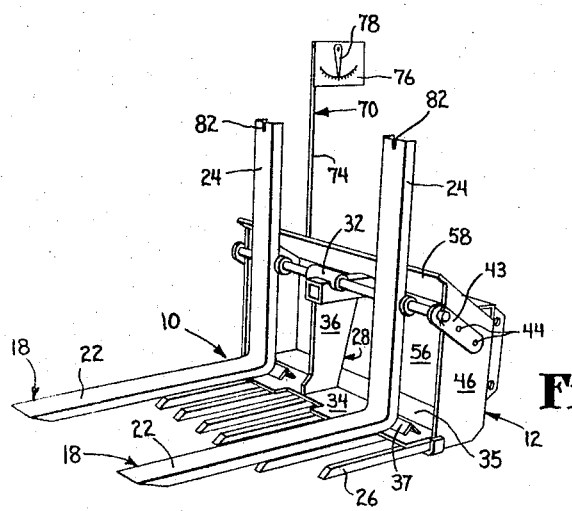
FIG. 2 is a pictorial view of the bucket with the converter means and the level indicator installed on the bucket.

A laterally-extending supporting rod 38 is adapted to be passed through the sleeve 32, and through aligned sleeves 40 secured to the rear of the upright legs 24 of the lift-forks 18 at a substantial elevation above the bend 20 thereof, and through the aligned opening 42 provided in a mounting bracket 43 secured in an upwardly-inclined position as by bolts 44 (FIG. 2) to each of the bucket side-plates 46, the brackets 43 thus co-operating to locate the position of the ends of the support bar 38. (It is contemplated that the brackets 43 would be permanently left on the bucket, the brackets 43 not interfering with the expected usage thereof.)

Figure 4:
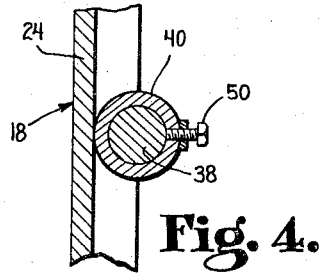
FIG. 4 is a detail view illustrating a connection of the support rod and a fork-lift of the converter means.

A cotter pin 48 or other suitable retaining means at each end of the supporting rod 38 retains the supporting rod against axial movement; and a set-screw 50 (FIG. 4) is provided for each fork-sleeve 40 for bearing against the support rod 38 to retain the lateral position of each of the fork-lifts 18.

It will be noted that the wide lateral extent of the base-plate 34, together with the end-support of rod 38 by the brackets 43 which are carried by the bucket side-walls 46, transmits the weight to the high-strength vertical panels of the bucket, minimizing the chance of deforming the horizontal bottom plate assembly of the bucket.

Further rigidity is provided by a tongue 52 (FIG. 5) which extends rearwardly from the upper support member 30 to be received in a slot 54 in the back-plate 56 of bucket 12, the slot 54 being located at the top of bucket back-plate 56 adjacent the sloping top-wall 58 of the bucket 12. The tongue 52 is provided with a hole 60 in a portion of the tongue 52 located rearwardly of the back-plate 56; and a pin 62 may be slipped into the hole 60 to hold the converter means 10 against forward movement.

The upper portion of the rear end of support member 30 is sloped, correspondingly to the slope of the bucket top-wall 58, and provides an abutment 64 engageable with the bucket top-wall 58.

It will be further noted that forward tipping of the fork-lifts 18 is restrained by the bucket side-plates 46 (through rod 38 and brackets 43) and by the bucket back-wall 56 and top-wall 58, providing great sturdiness; for this construction utilizes the depth-strength of the side-plates 46 and top-plate 58.

FIG. 6 illustrates a modified converter means 10a assembled onto a deeper bucket 12a. This embodiment is generally similar to the first embodiment, thus for brevity similarity is indicated merely by adding the suffix "a" to the reference numerals without repetitive textual description.

Certain differences should be noted, however, as follows: In this embodiment, there are no side-brackets 43, and thus the entire positioning of the axis of the support bar 38a is by the locking-tongue engagement of the rear region of upper support member 30a with the bucket plates 56 and 58, the support member 30a and sleeve 32a being elongated and the fore-and-aft extent of supporting post 36a being increased to provide the desired rigidity; and a set screw 66 extends through the upper sleeve 32a to bear against the supporting bar 38a to fix the axial position thereof.

Other rigidity is provided (FIG. 7), against a rearward movement of either end of the base plate 34 which would be occasioned by a force which would tend to cause a twisting of the converter means about a vertical axis, by a rearwardly-opening bracket 68 secured adjacent each end of the base-plate 34, the brackets 68 being of a shallow C-shape when viewed from the side. The brackets 68 fit over and against the bottom assembly of the bucket; that is, the upper face of the lower flange of the brackets 68 lies against the lower face of the bucket bottom-wall 35, and the lower face of the upper bracket-flange bears downwardly against either the bucket bottom-wall 35 or the digging prongs 26 according to the style of the bucket, here shown as against the prongs 26, the size of the opening or spacing between the bracket-flanges being provided accordingly.

Economical level-indicator means 70 (FIGS. 1 and 2) are also provided, as will now be described. A vertical bracket shown as a pipe or tube 72 is fixed as by welding to the bucket 14, at a rear and side location (the tube 72 being in an out-of-the-way location with respect to normal usage of the bucket 12 and may thus be left permanently on the bucket). Into this tube 72 is placed a removable rod 74 the top of which carries an indicator plate 76, and an indicator member 78 is freely pivoted to the indicator plate 76.

Thus in use, as a load 80 is being raised, the freely hanging indicator member 78 hangs vertically; and the operator can adjust his vehicle-linkage 16, by the vehicle-means (not shown) which provides such adjustment, to keep a suitable indication mark on plate 76 registered with indicator 78, calibrations on plate 76 being provided if desired, thus maintaining the load 80 at the desired orientation.

Slots 82 are shown as cut downwardly from the top end of the upright legs 24 of the forks 18, providing a convenient and economical means for securing a retaining chain 84.

From the foregoing, it will be seen that the concepts of the present invention provide a new and useful converter means having several advantages of ease and rapidity of assembly and dis-assembly with respect to a bucket of a utility vehicle for temporary or permanent conversion of a bucket-loader into a fork-lift vehicle, characterized by rigidity and sturdiness even though assembly and dis-assembly is accomplished conveniently and without tools (except if desired to assist pin-pulling), and provide economical level-indicator means likewise easily attachable and removable, and provide in the over-all a novel converter means for attaining the advantages and operating characteristics of a fork-lift vehicle on a bucket-loader vehicle, all without removal and re-assembly of the bucket thereof.

Accordingly, from the foregoing description of the invention according to the illustrative embodiments, considered with the accompanying drawings, it is seen that the invention provides a novel and useful device having desirable advantages and characteristics, and accomplishing its intended objects, including those hereinbefore pointed out and others which are inherent in the invention.

It will be understood that modifications and variations may be effected without departing from the scope of the novel concepts of the invention; accordingly it is to be understood that the invention is not limited to the specific embodiments thereof illustrated and described, or to the specific form or arrangement herein described and shown. Thus, because the invention is set forth herein with reference to a vehicle having its power bucket mounted at the front of the vehicle, the converter means has been set forth with the use of terms such as "front" and "rear" with reference to the front-mounted power bucket; but the invention is not to be considered as limited in this regard, those terms referring to directions as the user views the open end of the bucket.

What is claimed is:

1. A converter means for a utility vehicle having a power bucket, said means comprising:
   a supporting bracket, the said bracket including:
      a laterally-extending base-plate for lying along the bottom plate assembly of the bucket;
      a fore-and-aft supporting member spacedly positioned above the base-plate;

a laterally-extending sleeve spacedly positioned above the base-plate; and
means spacedly supporting the said supporting member and the said sleeve above the base-plate;
brackets secured to the bucket side-plates and each provided with an opening co-axial with the said sleeve;
a pair of lift-fork members of a general L-shape having one leg extending forwardly and one leg extending upwardly;
a sleeve means for the upright leg of each lift-fork co-axially located with respect to said bracket sleeve;
a support rod extending through said sleeve means and said bracket sleeve and said openings of said side-plate brackets;
the said fore-and-aft supporting member being retainingly engageable with a rear portion of the bucket.

2. A converter means for a utility vehicle having a power bucket, said means comprising:
a supporting bracket, the said bracket including:
a laterally-extending base-plate for lying along the bottom plate assembly of the bucket;
a fore-and-aft supporting member spacedly positioned above the base-plate;
a laterally-extending sleeve spacedly positioned above the base-plate; and
means spacedly supporting the said supporting member and the said sleeve above the base-plate;
a pair of lift-fork members of a general L-shape having one leg extending forwardly and one leg extending upwardly;
a sleeve means for the upright leg of each lift-fork co-axially located with respect to said bracket sleeve;
a support rod extending through said sleeve means and said bracket sleeve and into retaining engagement with retaining means provided on the bucket side-plates;
the said fore-and-aft supporting member being retainingly engageable with a rear portion of the bucket.

3. A converter means for a utility vehicle having a power bucket, said means comprising:
a supporting bracket, the said bracket including:
a laterally-extending base-plate for lying along the bottom plate assembly of the bucket;
a fore-and-aft supporting member spacedly positioned above the base-plate;
a laterally-extending sleeve spacedly positioned above the base-plate; and
means spacedly supporting the said supporting member and the said sleeve above the base-plate;
a pair of lift-fork members of a general L-shape having one leg extending forwardly and one leg extending upwardly;
a sleeve means for the upright leg of each lift-fork co-axially located with respect to said bracket sleeve;
a support rod extending through said sleeve means and said bracket sleeve;
the said fore-and-aft supporting member being retainingly engageable with a rear portion of the bucket.

4. A converter means for a utility vehicle having a power bucket, said means comprising:
a pair of lift-fork members of a general L-shape having one leg extending forwardly and one leg extending upwardly;
a sleeve means for the upright leg of each lift-fork;
a support rod extending through said sleeve means and into retaining engagement with retaining means provided on the bucket side-plates;
means supporting said support rod upwardly of the bucket bottom-plate and forwardly of the bucket rear-plate.

5. A converter means for a utility vehicle having a power bucket, said means comprising:
a pair of lift-fork members of a general L-shape having one leg extending forwardly and one leg extending upwardly;
a sleeve means for the upright leg of each lift-fork;
a support rod extending through said sleeve means and into retaining engagement with retaining means provided on the bucket side-plates.

6. A converter means for a utility vehicle having a power bucket, said means comprising:
fork-lift means;
an adapter-plate adapted to be positioned to extend laterally of the bucket and supported by the bottom-plate assembly of the bucket for supporting the fork-lift means;
the said adapter-plate being provided with a mount for the fork-lift means, the mount providing an inclined bearing surface which extends upwardly and rearwardly from the adapter-plate;
means supporting said fork-lift means by the bucket at a position substantially above said adapter-plate.

7. A support bracket for converting the bucket of a power vehicle to auxiliary support use, comprising:
an adapter-plate adapted to be positioned to extend laterally of the bucket and supported by the bottom-plate assembly of the bucket;
a fore-and-aft supporting member spacedly positioned above the adapter-plate;
a laterally-extending support means adapted to be retainingly engaged by the bucket side-plates;
means spacedly supporting the said supporting member and said laterally-extending support means above the adapter-plate;
the fore-and-aft supporting member having at its rear retaining means for retaining engagement with a rear portion of the bucket.

8. A converter means for a utility vehicle having a power bucket, said means comprising:
a pair of lift-fork members of a general L-shape having one leg extending forwardly and one leg extending upwardly;
an adapter means having a forwardly-facing abutment to restrain rearward movement of the forwardly-extending lift-fork legs;
the adapter means having a rearwardly-facing abutment engageable with the bucket bottom-plate to restrain rearward movement of the adapter means;
and means supportingly secured to the upright legs of said lift-forks at an elevated position thereon to restrain vertical-plane swinging of said upright legs.

9. A converter means for a utility vehicle having a power bucket, said means comprising:
a pair of lift-fork members of a general L-shape having one leg extending forwardly and one leg extending upwardly;
an adapter means having a forwardly-facing abutment to restrain rearward movement of the forwardly-extending lift-fork legs;
and means supportingly secured to the upright legs of said lift-forks at an elevated position thereon to restrain vertical-plane swinging of said upright legs;
said means being also supportingly secured to a rear portion of said bucket.

10. A converter means for a utility vehicle having a power bucket, said means comprising:
a pair of lift-fork members of a general L-shape having one leg extending forwardly and one leg extending upwardly;
an adapter means having a forwardly-facing abutment to restrain rearward movement of the forwardly extending lift-fork legs;
and means supportingly secured to the upright legs of said lift-forks at an elevated position thereon to restrain vertical-plane swinging of said upright legs;
said means being also supportingly secured to the bucket side-plates.

11. A converter means for a vehicle having a bucket, comprising fork-lift means, and bracket means removably connectable to the bucket for removably connecting the fork-lift means to the bucket;

the fork-lift means having a forwardly-extending load-supporting arm;

the bracket means being secured to the bucket substantially above the bottom wall of the bucket and above said arm;

the bracket means including mount means supported by the bucket for supporting said arm and restraining aftward movement thereof.

References Cited by the Examiner

UNITED STATES PATENTS

| | | |
|---|---|---|
| 1,993,282 | 3/1935 | Porter. |
| 2,486,697 | 11/1949 | White. |
| 2,668,631 | 2/1954 | Reese. |
| 2,812,595 | 11/1957 | Drott. |
| 3,032,220 | 5/1962 | Love _____ 214—620 |
| 3,075,665 | 1/1963 | Repke _____ 214—731 |

HUGO O. SCHULZ, *Primary Examiner.*